United States Patent
Omernik et al.

(10) Patent No.: US 12,188,702 B2
(45) Date of Patent: Jan. 7, 2025

(54) CALIBRATING COMPRESSOR BEARING SYSTEMS

(71) Applicant: TRANE INTERNATIONAL INC., Davidson, NC (US)

(72) Inventors: Matthew David Omernik, La Crosse, WI (US); Joseph M. Heger, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 250 days.

(21) Appl. No.: 17/743,317

(22) Filed: May 12, 2022

(65) Prior Publication Data

US 2023/0366600 A1    Nov. 16, 2023

(51) Int. Cl.
| | |
|---|---|
| *F25B 49/02* | (2006.01) |
| *F04D 15/02* | (2006.01) |
| *F04D 29/05* | (2006.01) |
| *F04D 29/058* | (2006.01) |
| *F25B 31/02* | (2006.01) |
| *F04D 29/048* | (2006.01) |
| *F16C 32/04* | (2006.01) |

(52) U.S. Cl.
CPC ........ *F25B 49/022* (2013.01); *F04D 15/0263* (2013.01); *F04D 29/058* (2013.01); *F25B 31/026* (2013.01); *F04D 29/048* (2013.01); *F16C 32/0444* (2013.01)

(58) Field of Classification Search
CPC .... F04D 15/0263; F04D 29/04; F04D 29/046; F04D 29/048; F04D 29/05; F04D 29/056; F04D 29/058; F16C 32/0444
See application file for complete search history.

(56) References Cited

U.S. PATENT DOCUMENTS

| | | | |
|---|---|---|---|
| 10,738,781 B2 | 8/2020 | Johnson et al. | |
| 2008/0028780 A1* | 2/2008 | Song ............... | F25B 49/022 62/228.1 |
| 2020/0003214 A1* | 1/2020 | Johnson ............ | F04C 28/22 |

FOREIGN PATENT DOCUMENTS

| | | | | |
|---|---|---|---|---|
| CN | 113653734 A | * | 11/2021 | ............ F16C 32/04 |
| GB | 2452128 A | * | 2/2009 | ............ F04B 49/06 |

* cited by examiner

*Primary Examiner* — Jerry-Daryl Fletcher
*Assistant Examiner* — Daniel C Comings
(74) *Attorney, Agent, or Firm* — HSML P.C.

(57) ABSTRACT

Re-calibrating a bearing system of a compressor includes analyzing environmental data pertaining to a compressor to detect occurrence of a calibration threshold event, and re-calibrating the bearing system based on the detected calibration threshold event by controlling placement of a shaft relative to the bearing system of the compressor.

16 Claims, 7 Drawing Sheets

CALIBRATING COMPRESSOR BEARING SYSTEMS

FIELD

This disclosure relates to compressor bearing systems. More specifically, this disclosure relates to calibration of bearing systems in compressors utilized in heating, ventilation, air conditioning, and refrigeration ("HVACR") systems.

BACKGROUND

HVACR systems are generally used to provide environmental control of an enclosed space (e.g., an interior space of a commercial building or a residential building, an interior space of a refrigerated transport unit, or the like). An HVACR system may include a heat transfer circuit that utilizes a working fluid for providing cooled or heated air to an area. The heat transfer circuit includes a compressor. The compressor includes a shaft that is rotated to compress the working fluid, and one or more bearings for supporting the rotating shaft within the compressor.

SUMMARY

This disclosure relates to bearings in compressors. More specifically, this disclosure relates to calibration of bearing systems in compressors utilized in HVACR systems.

In some embodiments, the calibration or re-calibration of a bearing system for a compressor can include the bearing(s) moving the shaft of the compressor to contact, for example, back-up bearings or the compressor housing to measure actual clearance at a given temperature. The measured clearance can be used to determine the calibrated or re-calibrated levitation position of the shaft relative to, for example, the housing, the bearings, or the position sensors.

In some embodiments, the calibration or re-calibration of a bearing system for a compressor can be based on a predetermined correlation of a measured temperature and the calibrated position, and adjusting the shaft to the position corresponding to the system temperature. The calibration is executed, typically after the compressor has been inactive and the temperature of the compressor and its components are ambient. However, contemplated herein are embodiments by which an algorithmic calibration is executed while the compressor is operating.

In an embodiment, a controller, corresponding to the compressor, includes a receiver to receive environmental data pertaining to a compressor; a threshold event detector to detect occurrence of a calibration threshold event based on the received environmental data; and a calibrator to re-calibrate a bearing system based on the detected calibration threshold event by controlling placement of a shaft relative to the bearing system of the compressor.

In another embodiment, a method of calibrating a bearing system of a compressor includes receiving environmental data pertaining to the compressor; detecting occurrence of a calibration threshold event based on the received environmental data; and re-calibrating a bearing system based on the detected calibration threshold event by controlling placement of a shaft relative to the bearing system of the compressor.

In yet another embodiment, a non-transitory computer-readable medium for a controller stores computer-executable instructions that, upon execution, cause one or more processors to execute functions for calibrating a bearing system of a compressor. The instructions include receiving environmental data pertaining to the compressor; detecting occurrence of a calibration threshold event based on the received environmental data; and re-calibrating a bearing system based on the detected calibration threshold event by controlling placement of a shaft relative to the bearing system of the compressor.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
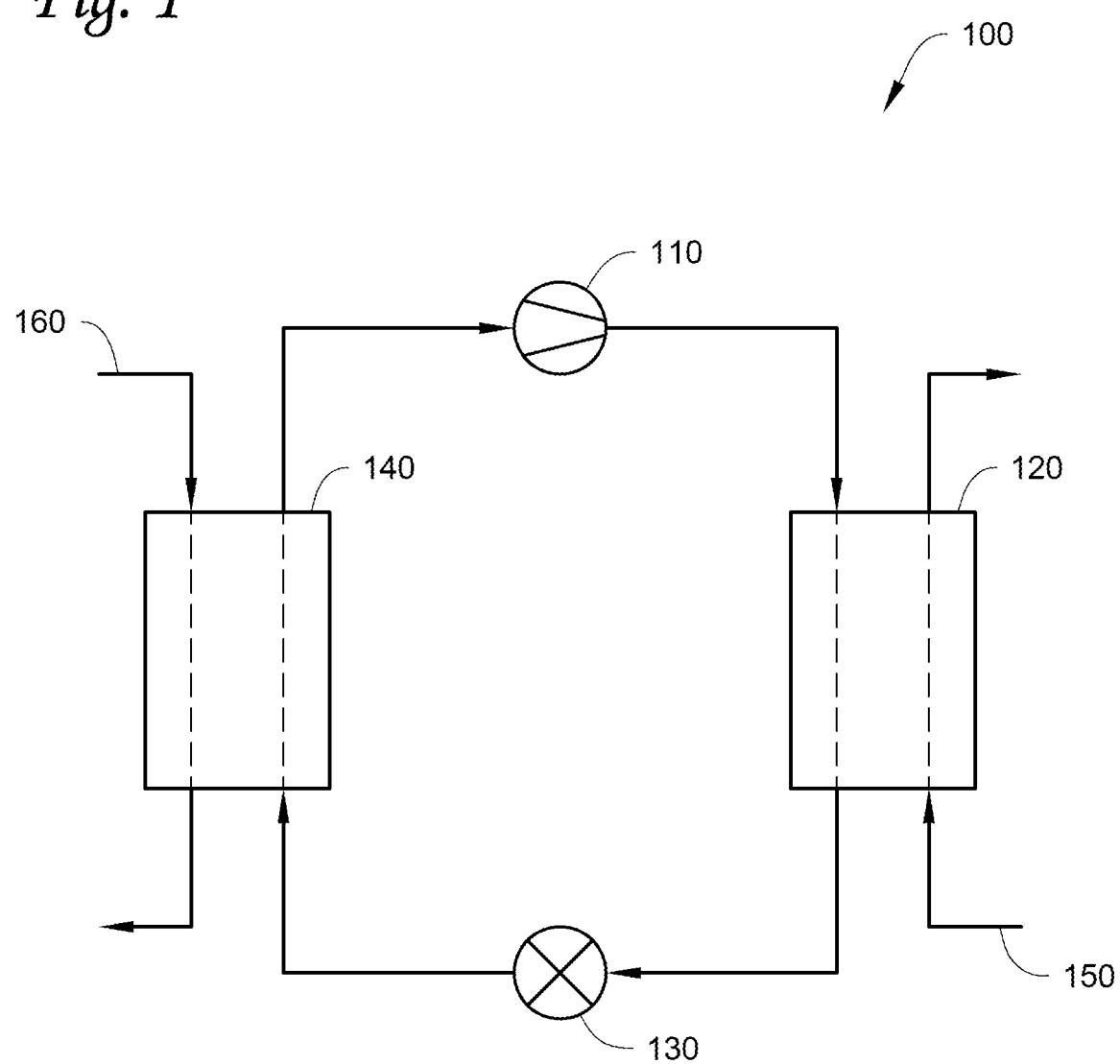
FIG. 1 is a schematic diagram of a heat transfer circuit of an HVACR system, in accordance with at least one embodiment described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein. Described and recited herein are embodiments pertaining to temperature-induced calibration of one or more bearings in a compressor that may be utilized in heating, ventilation, air conditioning, and refrigeration ("HVACR") systems.

Embodiments described herein are directed to compressor, and HVACR systems that include compressors, including compressors that utilize one or more magnetic bearings. In an embodiment, the compressor can be a screw compressor, a scroll compressor, or the like. In an embodiment, the compressor is a centrifugal compressor.

An HVACR system can include a heat transfer circuit configured to heat or cool a process fluid (e.g., air, water and/or glycol, or the like). The heat transfer circuit includes a compressor that compresses a working fluid that circulates through the heat transfer circuit. The compressor can include a housing, a shaft, and one or more bearings to support the shaft. The compressor compresses the working fluid by rotating the shaft relative to the housing, and the one or more bearings support the shaft relative to the housing while the shaft rotates.

The one or more bearings support the shaft of the compressor in radial and/or axial directions relative to the shaft. Further, the one or more bearings can be non-contact bearings. Examples of non-contact bearings, can include, but not limited to magnetic bearings, air bearings, or the like. Magnetic bearings can generate one or more magnetic fields to levitate the shaft within the housing of the compressor, thus avoiding or reducing friction between the rotating shaft and stationary housing of the compressor. Air bearings can generate air pressure to levitate the shaft.

Because a shaft of a compressor may be supported by one or more bearings within a given compressor, reference herein may be made to a bearing system, which may refer to at least one of the bearings for the given compressor.

To lessen the likelihood of a shaft crashing into the housing of a corresponding compressor or bearing, a bearing controller acts to maintain a clearance between the shaft and the housing when the shaft is levitated. For example, a levitating position can be maintained by controlling the output of the magnetic fields generated by the magnetic bearing. The clearance can be determined or approximated from obtaining one or more linear distances between specific locations on the compressor (e.g., a location on a surface of the housing of the compressor facing the surface the shaft in one or more axial and/or radial directions) and corresponding specific locations on the surface of the shaft. The respective relative positions can be monitored consistently to stop operation of the compressor when one or more of the measured clearances are beyond a predetermined range, in order to prevent or reduce the risk of the shaft crashing into the housing or the bearing.

Materials used in the composition of a compressor and its components tend to shrink or expand according to the ambient temperatures corresponding to the compressor. Accordingly, when the ambient temperature of compressor changes, due to ambient conditions and/or heat generated by the compressor itself, the temperature of the compressor can change, changing the size of the components (e.g., the shaft, the housing, the bearings, sensors, etc.) and the relative distances, or clearances, between thereof. As referenced herein, ambient temperature may refer to environmental conditions surrounding or even within the compressor.

One or more position sensors can monitor the clearance between a shaft and its corresponding bearings and transmit an alert when one or more of the clearances measured are beyond their respective tolerances, resulting in operation of the compressor stopping to prevent damages to the compressor. However, this type of operation stoppage results in compressor system downtime. By triggering a calibration based on a measured temperature corresponding to the compressor, surrounding and/or within, the compressor can be re-calibrated to avoid such downtime. Position sensors can also be affected by temperature changes, affecting the measured clearance. Thus, the calibration and/or re-calibration can further include calibrating the position sensors based on the ambient temperature.

FIG. 1 is a schematic diagram of a heat transfer circuit 100 of an HVACR system, according to an embodiment. The heat transfer circuit 100 includes components that are fluidly connected to each other, including a compressor 110, a condenser 120, an expander 130, an evaporator 140, etc. In other embodiments, additional components can include an economizer heat exchanger, one or more flow control devices, a receiver tank, a dryer, a suction-liquid heat exchanger, or the like.

The heat transfer circuit 100 can be configured as a cooling system (e.g., a water chiller, a fluid chiller of an HVACR, an air conditioning system, or the like) that can be operated in a cooling mode. The heat transfer circuit 100 can be configured to operate as a heat pump system that can run in a cooling mode and a heating mode.

The heat transfer circuit 100 applies known principles of a vapor-compression refrigeration cycle. The heat transfer circuit 100 can be configured to heat or cool any process fluid such as water, glycol, gas, air, or the like. In an embodiment, the heat transfer circuit 100 may represent a chiller system that cools any process fluids such as water, glycol, gas, air, or the like. In an embodiment, the heat transfer circuit 100 may represent an air conditioner and/or a heat pump that cools and/or heats a process fluid such as air, water, or the like.

During the operation of the heat transfer circuit 100, a working fluid (e.g., refrigerant, refrigerant mixture, or the like) flows into the compressor 110 from the evaporator 140 in a gaseous state at a relatively low pressure. The compressor 110 compresses the gaseous working fluid into a high pressure state having a relatively high pressure, which also heats the gaseous working fluid to a relatively high temperature. After being compressed, the relatively higher pressure and/or higher temperature gaseous working fluid flows from the compressor 110 to the condenser 120. In addition to the working fluid flowing through the condenser 120, a first process fluid 150 (e.g., external air, external water, chiller water, or the like) also separately flows through the condenser 120. The first process fluid 150 exchanges thermal energy with the working fluid as the first process fluid 150 flows through the condenser 120, cooling the working fluid as it flows through the condenser 120. The working fluid condenses to liquid and then flows into the expander 130.

The expander 130 allows the working fluid to expand, lowering the pressure of the working fluid and converting the working fluid into a vapor state, or predominately vapor state, lowering the temperature and/or pressure of the working fluid. In an embodiment, the expander 130 can be an expansion valve, expansion plate, expansion vessel, orifice, or the like, or other such types of expansion mechanisms. It should be appreciated that the expander may be any type of expander used in the field of expanding a working fluid to cause the working fluid to decrease in pressure and/or temperature.

The relatively lower temperature and/or pressure working fluid then flows into the evaporator 140. A second process fluid 160 (e.g., air, water, glycol, or the like) also flows through the evaporator 140. The working fluid exchanges thermal energy with the second process fluid 160 as it flows through the evaporator 140, cooling the second process fluid 160 as it flows through the evaporator 140. As the working fluid exchanges thermal energy (e.g., absorb heat), the working fluid evaporates to a gaseous state, or a predominately gaseous state. The working fluid then returns to the compressor 110 from the evaporator 140. The above-described process continues while the heat transfer circuit 100 is operated, for example, in a cooling mode. In some embodiments, the compressor 110 is a centrifugal compressor.

Figure 2:
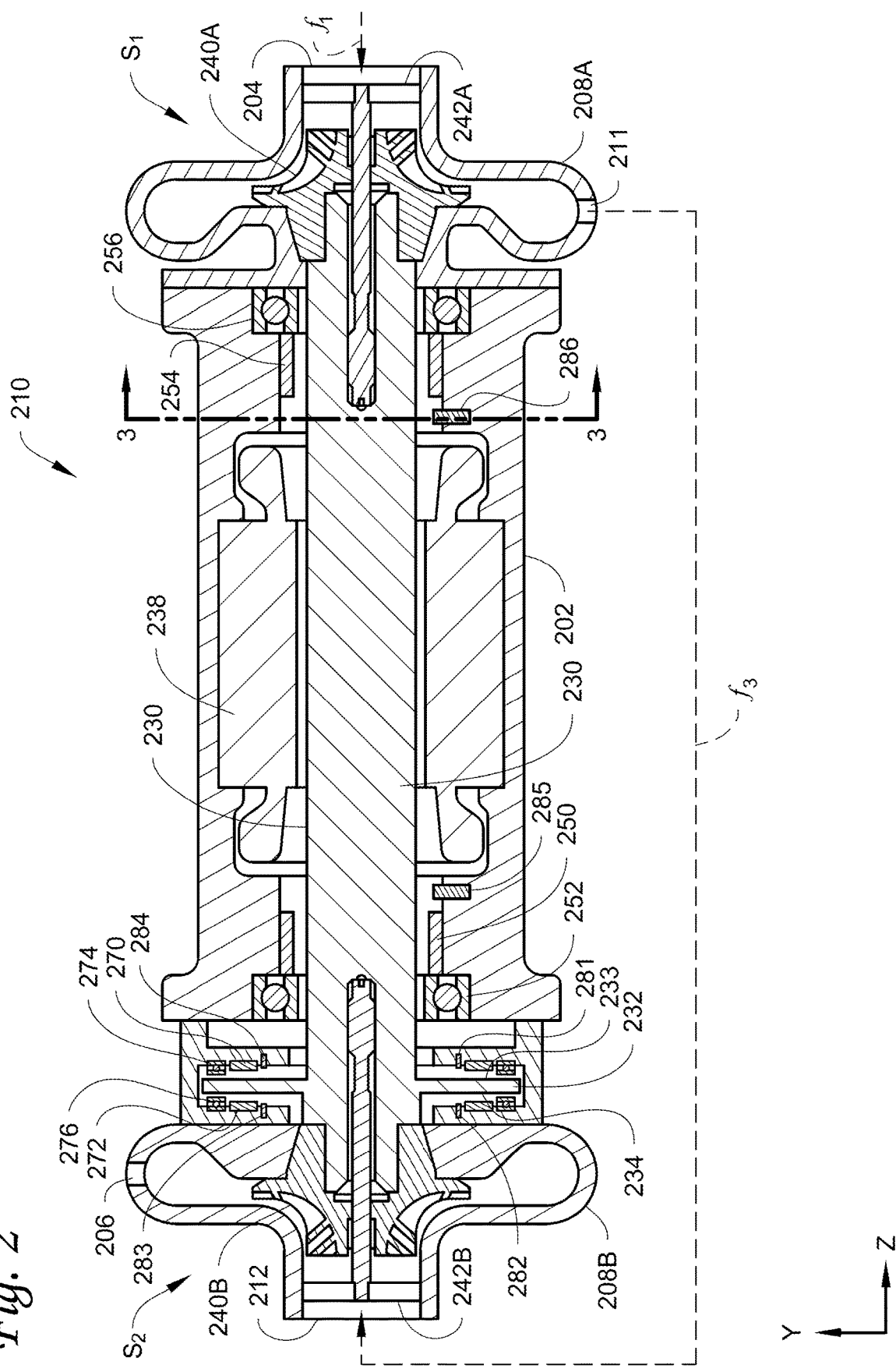
FIG. 2 is a cross-sectional view of a compressor, in accordance with at least one embodiment described and recited herein.

FIG. 2 is a cross-sectional view of a compressor 210 according to an embodiment. The compressor 210 can be a centrifugal compressor that can be used in the heat transfer circuit 100 of FIG. 1 as the compressor 110 to compress a working fluid.

The compressor 210 includes a housing 202, a shaft 230, a stator 238, and impellers 240A, 240B. The housing 202 includes an inlet 204, an outlet 206, and endcaps 208A, 208B for the impellers 240A, 240B respectively. The working fluid to be compressed enters the compressor 210 through the inlet 204 as shown by the dashed arrow $f_1$. The compressed working fluid is discharged from the compressor 210 through the outlet 206 as shown by the dashed arrow $f_2$. In an embodiment, the compressor 210 is an oil-free compressor.

The compressor 210 has a first compression stage $S_1$ with the first impeller 240A and a second compression stage $S_2$ with the second impeller 240B. Each stage $S_1$, $S_2$ also includes an inlet vane guide (IVG) 242A, 242B. The housing 202 includes an intermediate outlet 211 in the endcap 208A for the first stage $S_1$, and an intermediate inlet 212 in the endcap 208B for the second stage $S_2$. The working fluid flows from the first stage $S_1$ to the second stage $S_2$ through the intermediate outlet 211 and the intermediate inlet 212 as shown by the dashed line $f_3$. In an embodiment, the dashed line $f_3$ may be a line that fluidly connects the intermediate outlet 211 and the intermediate inlet 212. The dashed line $f_3$ is shown in FIG. 2 as extending outside of the housing 202. However, it should be appreciated that the flow path shown by the dashed line $f_3$ may extend partially or completely within the housing 202 in an embodiment.

The impellers 240A, 240B and the inlet guide vanes 242A, 242B are each fixedly attached to the shaft 230. The stator 238 rotates the shaft 230 that rotates the impellers 240A, 240B and the inlet guide vanes 242A, 242B. The working fluid is compressed in the first stage $S_1$ and the second stage $S_2$ by the rotating impellers 240A, 240B respectively. A working fluid to be compressed is suctioned through the inlet 204, compressed in the first stage $S_1$, flowed from the first stage $S_1$ to the second stage $S_2$, is further compressed in the second stage $S_2$, and is then discharged through the outlet 206. The working fluid discharged from the second stage $S_2$ via the outlet 206 has a higher pressure than the working fluid discharged from the first stage $S_1$ via the intermediate outlet 211.

The compressor 210 can include bearings 250, 252, 254, 256, 270, 272, 274, 276 for supporting the shaft 230 within the housing 202 while the shaft 230 rotates. Radial bearings 250, 252, 254, 256 radially support the shaft 230 and thrust bearings 270, 272, 274, 276 axially support the shaft 230 while shaft 230 rotates. That is, radial bearings 250, 252, 254, 256 radially support the shaft 230 in the radial directions (e.g., the x-direction shown in FIG. 3, and the y-direction) while the shaft 230 rotates, and thrust bearings 270, 272, 274, 276 axially support the shaft 230 in an axial (e.g., z-direction) while the shaft 230 rotates.

In an embodiment, the radial bearings 250, 254 are non-contact bearings that radially support the shaft 230 in the radial direction. In accordance with at least one embodiments described and recited, the radial bearings 250, 254 are magnetic bearings, and radial bearings 252, 256 are radial ball bearings that back-up the radial bearings 250, 254. Specifically, the radial bearing 252 backs up the radial bearing 250, and the radial bearing 256 backs up the radial bearing 254.

The shaft 230 includes a thrust runner 232 that extends in the radial direction relative to the shaft 230. The thrust runner 232 includes a first thrust surface 233 and a second thrust surface 234. In an embodiment, the thrust bearings 270, 272 are non-contact bearings that axially supports the shaft 230 in an axial direction, and in accordance with at least some embodiments described and recited herein, the thrust bearings 270, 272 are magnetic bearings. The thrust bearing 274 is a thrust ball bearing that backs up the thrust bearing 270, thrust bearing 276 is a thrust ball bearing that backs up the thrust bearing 272, and thrust bearing 270 and thrust ball bearing 274 each faces the first thrust surface 233 of the thrust runner 232 of the shaft 230 in the axial direction. The thrust bearing 272 and the thrust ball bearing 276 each faces the second thrust surface 234 of the thrust runner 232 of the shaft 230 in the axial direction (e.g., z-direction).

It is appreciated that, in some embodiments, the bearings (e.g., 252, 256, 274, 276) can back up another bearing (e.g., 250, 254, 270, 272) by being positioned closer to the surface of the shaft 230 such that, when the shaft 230 moves in the supported direction, the shaft 230 will contact the back-up bearings (e.g., 252, 256, 274, 276) before contacting the other bearings (e.g., 250, 254, 270, 272). For example, the supported direction can be the z-direction for the bearings 270, 272, 274, 276 and the x-direction and/or y-direction for the bearings 250, 252, 254, 256. As illustrated in FIG. 2, position sensors 281-286 are located in the housing 202 to measure a clearance between the position sensors 281-286 and the respective measured surfaces. The position sensors 281, 284 can be disposed in the housing 202 near or adjacent to the bearing 270 to measure the clearance between the position sensors 281, 284 and the first thrust surface 233. The position sensors 282, 283 can be located in the housing 202 near or adjacent to the bearing 272 to measure the clearance between the position sensors 282, 283 and the second thrust surface 234. The position sensors 285, 286 can be located in the housing 202 near or adjacent to the bearings 250, 254 respectively to measure the clearance between the position sensors 285, 286 and the surface of the shaft at 345 and 236. It is appreciated that the position sensors 281-286 can be located anywhere in the housing 202 so long as the clearance between the shaft and the bearings and/or the housing 202 can be measured.

As illustrated in FIG. 2, the thrust bearing 270 is located radially outward of the thrust bearing 274. However, the thrust bearing 270, in some embodiments, may be located radially inward of the thrust bearing 274. As also illustrated in FIG. 2, the thrust bearing 272 is located radially outward of the thrust bearing 276. However, the thrust bearing 272 in some embodiments may be located radially inward of the thrust bearing 276.

It is appreciated that, as illustrated in FIG. 2, the compressor 210 includes two thrust bearings 270, 272 with two thrust bearings 274, 276 as back-ups. However, it should be appreciated that the compressor 210 in some embodiments may include any number of any one or more type (e.g., air bearing, magnetic bearing, ball bearing, etc.) of supporting bearings and/or back-up bearings.

It is further appreciated that, as illustrated in FIG. 2, the compressor 210 is one example of a centrifugal compressor showing two stages of compression. In some embodiments, the compressor 210 can have one stage or more than two stages of compression.

Figure 3:
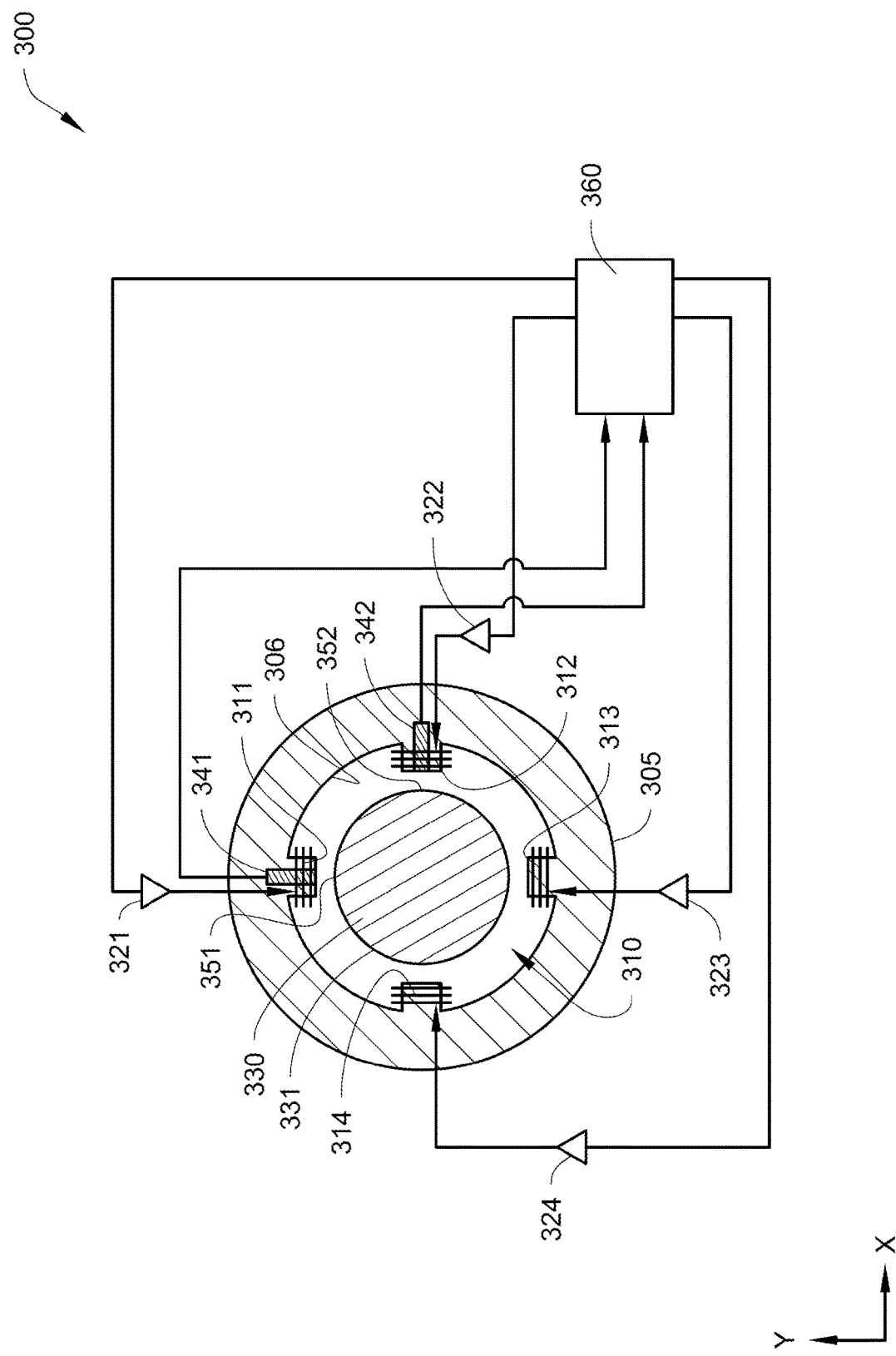
FIG. 3 a schematic sectional view of a bearing, in accordance with at least one embodiment described and recited herein.

FIG. 3 is a schematic sectional view of a bearing 300 according to at least one embodiment described and recited herein. The schematic sectional view can be a schematic sectional view of the compressor 210 of FIG. 2 at line 3-3. In some embodiments, the bearing 300 can be representative of one or more radial magnetic bearings. In accordance with at least one embodiment, bearing 300 can represent the radial bearing 250 and/or radial bearing 254 shown and described with reference to FIG. 2. In one embodiment, shaft 330 can be representative of the shaft 230 shown and described with reference to FIG. 2.

As illustrated in FIG. 3, the bearing 300 is a radial magnetic bearing that supports the shaft 330. The shaft 330 can be rotated, for example, by the stator 238 shown and described with reference to FIG. 2. The radial magnetic bearing 300 includes a stationary member 305 and a bearing bore 310. The stationary member 305 can be in a fixed position in relation to a housing of the compressor (e.g., the housing 202 of the compressor 210). The bearing bore 310 can be a space inside the stationary member 305 that extends in the radial direction, and the shaft 330 can levitate in the bearing bore 310. In some embodiments, the shaft 330 can levitate and rotate (e.g., spin about the axial of the shaft) in the bearing bore 310, preventing or reducing physical contact with the stationary member 305 during operation of the compressor. In some embodiments, the magnetic bearing 300 levitates the shaft 330 at a levitating position within the bearing bore 310 such the clearance between a radial surface 331 and one or more reference points on the stationary member 305 are each respectively maintained within a determined or predetermined range or tolerance. The one or more reference points can refer to respective locations of a position sensor installed in the stationary member 305 near or adjacent to the stationary member 305 such that a measured distance between the position sensor and the radial surface 331 is the same or is closely correlated with the actual clearance between the stationary member 305 and the radial surface 331.

In some embodiments, the bearing bore 310 is the space directed radially inward of the radial surface 331 of the stationary member 305 to provide a clearance between the shaft 330 and any physical components of the stationary member 305. The clearance provides a space to reduce and/or avoid physical contact between the shaft 330 and the bearing 300.

The bearing 300 can further include a plurality of magnets 311, 312, 313, 314, though this configuration is not intended to be limiting in quantity. In some embodiments, the magnets can include one or more electromagnets, one or more permanent magnets, or a combination hereof.

In the non-limiting example of FIG. 3, the magnets 311, 312, 313, 314 are electromagnets and can produce the suitable magnetic levitation to support a bearing load (e.g., the weight of a shaft). The bearing 300 can include amplifiers 321, 322, 323, 324 that can produce suitable electrical current output for the magnets 311, 312, 313, 314 in order to produce one or more magnetic fields to levitate the shaft 330.

The bearing 300 can include one or more position sensors 341, 342, including a first position sensor 341 and a second position sensor 342. The position sensors 341, 342 measure respective clearances (e.g., a distance) between the shaft 330 and the position sensor 341 or 342 in order to determine a clearance between the radial surface 331 of the shaft 330 and the stationary member 305 of the bearing 300. In some embodiments, the clearance between position sensors and shaft 330 can correlate to a clearance between magnets (e.g., 311, 312, 313, 314) and the radial surface 331 of the shaft 330. For example, the clearance between the bearing/magnets and the shaft can be determined by adjusting the measured clearance by a predetermined radial distance between position sensors and magnets.

In some embodiments, the measured clearance is in an x-y plane as illustrated in FIG. 3, although the measured clearance is not required to be in an x-y plane, which is orthogonal to the spring axial of the shaft 330. The position sensor can be placed at a predetermined angle relative to the x-y plane to determine a measured distance at a predetermined angle relative to the x-y plane.

In the illustrative example of the bearing 300 in FIG. 3, the position sensors 341, 342 are shown inside the magnets 311, 312, 313, 314. However, in some embodiments, the position sensors 341, 342 can be located anywhere in the bearing 300 so long as a clearance between the radial surface 331 of the shaft 330 and magnets (e.g., 311, 312, 313, 314) can be measured, as described herein.

It is appreciated that, in the illustrative example of the bearing 300 in FIG. 3, the magnets 311, 312, 313, 314 protrude from an inner surface 306 of the stationary member 305, having a shortest radial clearance between the shaft 330 and the stationary member 305 of the bearing 300. However, this configuration is not intended to be limiting. Also, the clearance or measured clearance is not required to be a shortest radial and/or axial distance between the shaft 330 and the stationary member 305 and/or any components (e.g., electromagnet, position sensor, etc.) of the stationary member 305 so long as the clearances can be measured to reflect the position of the shaft 330 relative the bearings and/or the housing of the compressor.

As shown in FIG. 3, the bearing 300 can include a controller 360 that may be configured to control the bearing 300. The controller 360 can be a machine or apparatus that is arranged to receive at least one input and provide at least one output to control the bearing 300. The controller 360 determines and executes control of the bearing 300 or a bearing system through the output according to the input(s). In some embodiments, the controller 360 can be configured to control one or more bearings associated with a shaft of a compressor. In some embodiments, the controller 360 controls the bearing 300 and the shaft 330 by transmitting a control signal to one or more of the electromagnets, determining sensed signals from position sensors, and/or conducting a re-calibration.

In some embodiments, the input can include environmental data corresponding to the compressor (e.g., 210 of FIG. 2), such as temperatures corresponding to the compressor and/or to any one or more components of the compressor (e.g., bearing, shaft, rotor, housing, etc.). The temperature may refer to a temperature measured at designated locations on a compressor, the bearing 300, and/or a bearing system (e.g., two or more bearings collectively support a shaft) of the compressor. In addition, or alternatively, the measured temperature may refer to, but not be limited to any one or more of temperature(s) at the rotor (e.g., 238 of FIG. 2), the stationary member 305 of the bearing 300, the bearing bore 310, the shaft 330, the housing (e.g., 202 of FIG. 2), the ports/inlets/outlets (e.g., 204, 206, 211, 212, etc. of FIG. 2), or the exterior of the compressors, i.e., ambient.

In some embodiments, the measured temperature may refer to, or be determined from, temperature surrogate data. Temperature surrogate data can include environmental data that can be converted to a temperature corresponding to the compressor. For example, temperature surrogate data can include a saturation pressure that can be converted into an ambient temperature within the compressor. In some embodiments, the temperature surrogate data input can include, but not be limited to, a refrigerant saturation pressure measured at certain positions of a compressor, e.g., rotor, bearing bore, endplate, housing, intake port, discharge port.

A bearing system can include one or more bearings and the controller 360, i.e., bearing system controller 360. In some embodiments, a bearing system can include one or more axial/radial bearings, one or more type of bearings (e.g., magnetic bearing, air bearing, ball bearing, foil bearing, etc.), and one or more controllers configured to control the bearing system. In some embodiments, the controller can include an installable add-on or software module to be added to an existing controller of the compressor and/or the bearing or bearing system. In some embodiments, the controller 360 can be a controller unit/module within another controller or within the main controller of the compressor.

In some embodiments, inputs to the controller 360 can include data pertaining to clearance or measured clearance obtained by one or more position sensors (e.g., 341, 342). In some embodiments, input pertaining to the clearance can include one or more measurements of distances between the shaft 330 and the bearing 300. For example, the controller 360 can measure the distance(s) by moving a non-spinning shaft (e.g., the shaft 330) to make physical contact with back up bearing(s), housing (e.g., 202 of FIG. 2). The physical contact between the shaft and the bearing or housing may change current and/or magnetic field associated with the bearing 300, and such changes can be correlated or converted into measured distances to determine the clearance between the shaft and the housing/bearings.

It is appreciated that a clearance, for example, between a shaft and a housing/bearing supporting the shaft may be regarded as one or more measured distances between an outer surface of the shaft and an inner surface of the housing/bearing. The measured distance can be in the x, y, and/or z-directions, one or more axial/radial directions of the shaft or bearings. The clearance can represent a volume or space within the housing such that the shaft can move anywhere within clearance without crashing into the housing/bearing or any other stationary (relative to a spinning shaft) components of the compressor.

As shown in FIG. 3, the controller 360 can receive sensed signals from the position sensors 341, 342, and the controller 360 can then send control signals to one or more of the magnets 311, 312, 313, 314 and/or one or more of the amplifier 321, 322, 323, 324 to control, for example, the output of the magnets 311-314. The output can include electromagnetic field(s) produced by the magnets 311-314.

Position sensors (e.g., 341, 342) can measure distances between the position sensors and the shaft to determine a clearance between the bearing/housing and the shaft. In the illustrated example, the position sensor 342 may sense the relative position of the shaft 330 (or the radial surface 331) to the stationary member 305 (or the position sensor 342), for example, in the x-direction. The position sensor 341 may sense the relative position of the shaft 330 (or the radial surface 331) to the stationary member 305 and/or the position sensor 341, for example, in the y-direction.

Based on the sensed signal(s) from the position sensor 341 and/or 342, the controller 360 can provide instructions to increase, decrease, or maintain electromagnetic field(s) produced by the magnets 311, 312, 313, 314, for example, through one or more of the amplifiers 321, 322, 323, 324, thus forming a feedback control loop. In one embodiment, a feedback control loop may operate from 1,000 Hz to 30,000 Hz. In another embodiment, the feedback control loop may operate from 10,000 Hz to 25,000 Hz. In yet another embodiment, the feedback control loop may operate from 15,000 Hz to 20,000 Hz.

The controller 360 control the magnets 311, 312, 313, 314 to maintain the sensed signal(s) from the position sensors (e.g., 341, 342, etc.) within a range. For example, the range for the sensed signal from position sensor 341 can be within a first range and the sensed signal from position sensor 342 can be within a second range. The range can be a range of shaft positions determined by the calibration to suitable for the operation of the compressor. For example, a calibration can determine that, when the position sensor 341 transmits a sensed signal corresponding to a measured distance of 1 millimeter to 1.3 millimeter, the shaft is operated within the range provided by the calibration. The sensed signals from the position sensors can correlate to a measured distance between a respective position sensor and an object. For example, the measured distance can be between the position sensor 341 and a location 351 on the radial surface 331 of the shaft 330 facing the position sensor 341. As another example, the measured distance can be between the position sensor 342 and a location 352 on the radial surface 331 of the shaft 330 facing the position sensor 342.

The controller 360 can be preprogramed with calibration data that includes predetermined ranges (e.g., the first range for position sensor 341 and the second range for position sensor 342) of tolerable clearances for the shaft (e.g., 230 of FIG. 2 or 330) to be positioned to provide for safe compressor operation. The calibrated position may refer to a levitating position at which the shaft 230 or 330 is centered in the bearing bore 310. In some embodiments, a levitation position suitable for the compressor operation can be a location at which the shaft 230 is maintained to have at least a minimum distance between the radial surface 331 of the shaft and the inner surface 306 of the stationary member 305 of the bearing 300. The minimum distance can be a predetermined distance determined, for example, by the manufacturer. However, these methods of determining levitating positions are illustrative and are not intended to be limiting.

Figure 5:
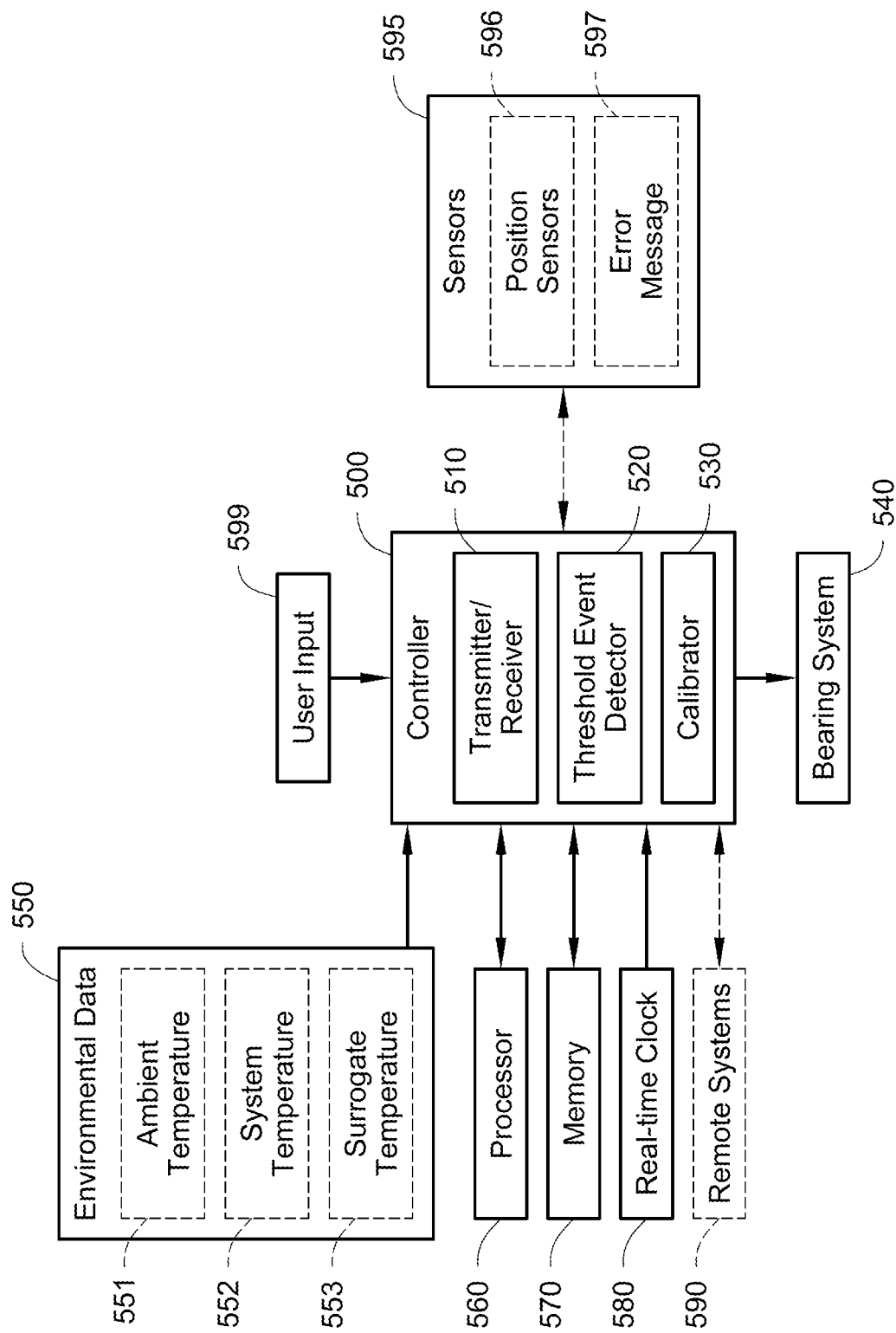
FIG. 5 is a block diagram of a controller of a bearing system, in accordance with at least one embodiment described and recited herein.
Figure 6:
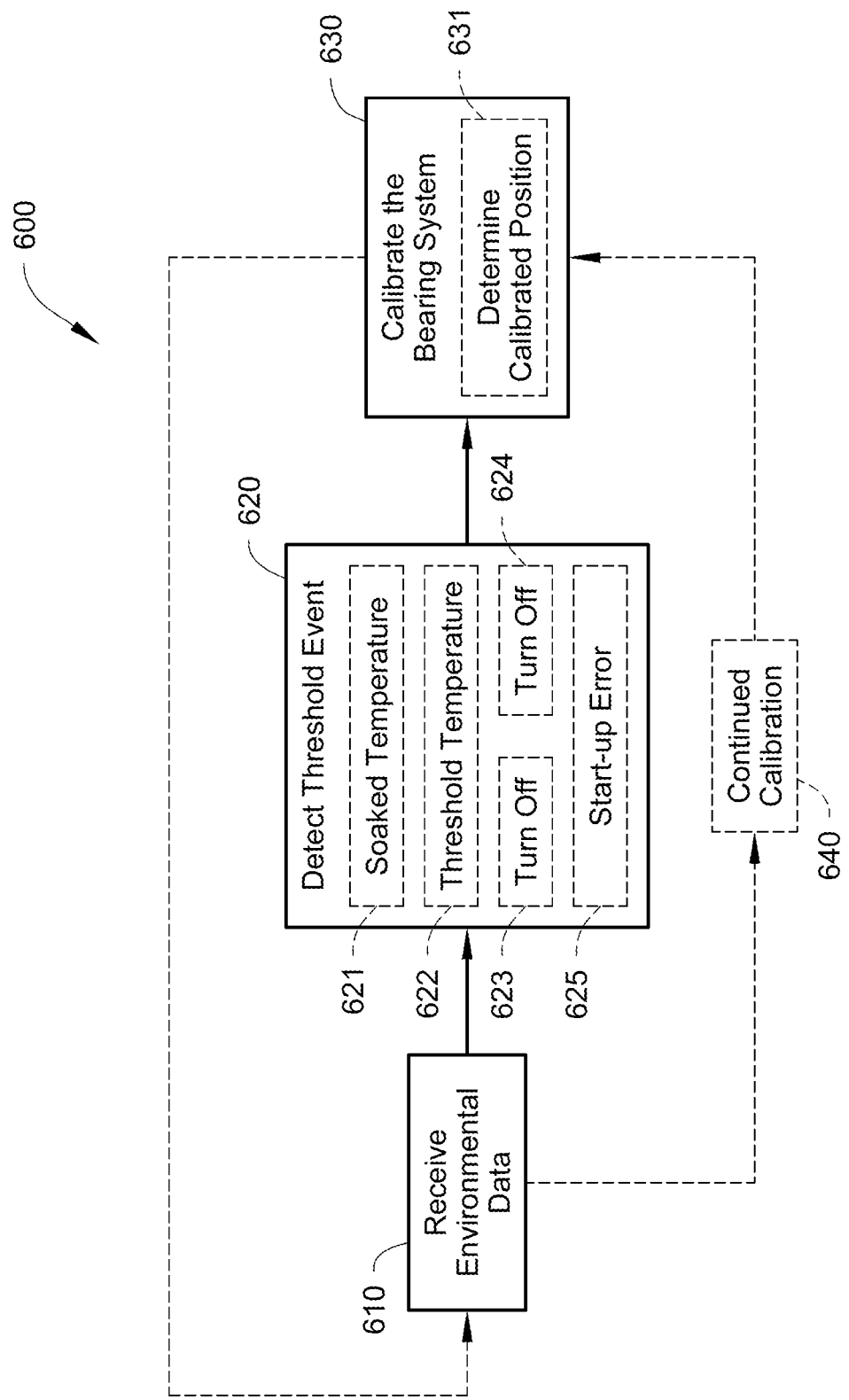
FIG. 6 is a flow chart showing a method for calibrating a bearing system of a compressor, in accordance with at least one embodiment described and recited herein.
Figure 7:
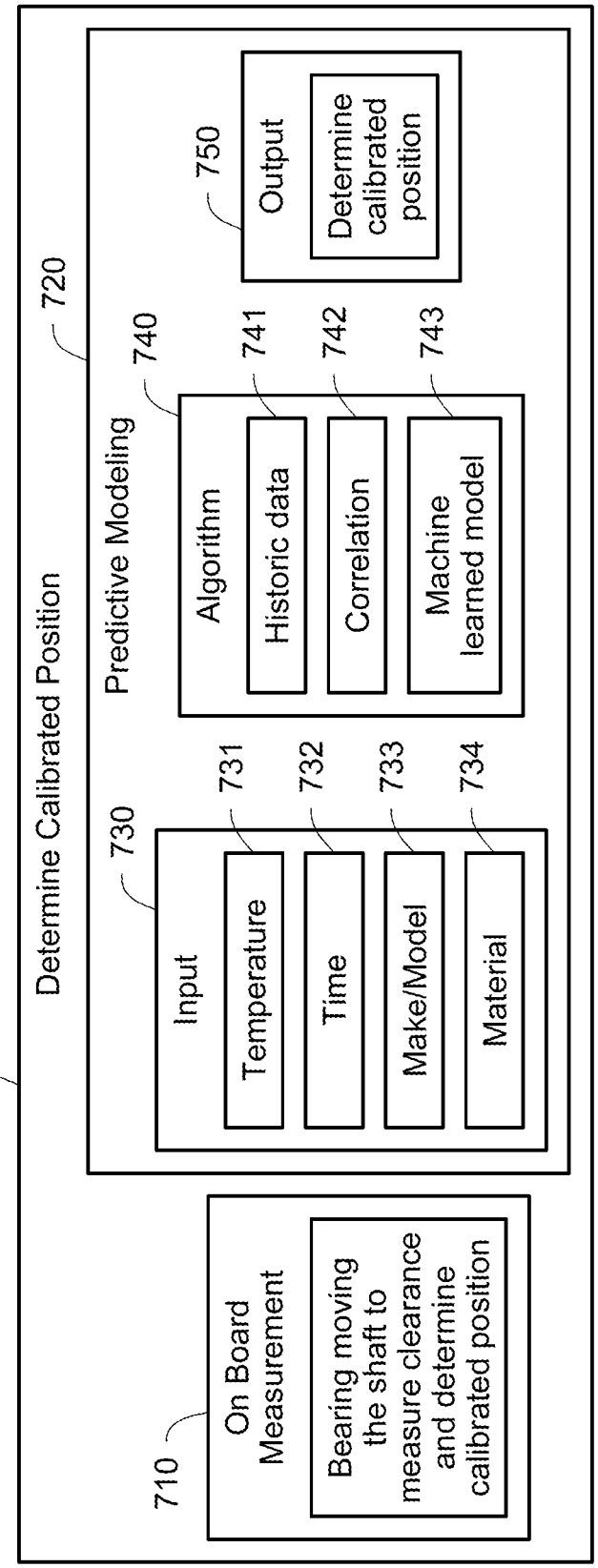
FIG. 7 is a block diagram for determining a calibrated position, in accordance with at least one embodiment described and recited herein.

As further discussed with respect to FIGS. 5-7, the controller (e.g., 360) can perform the re-calibration. In some embodiments, for conducting the re-calibration, determining a calibrated position or a levitating position can be performed physically, algorithmically, or a combination of both. In some embodiments, the controller 360 can be a controller of a HVACR system having the compressor with the bearing 300.

Figure 4:
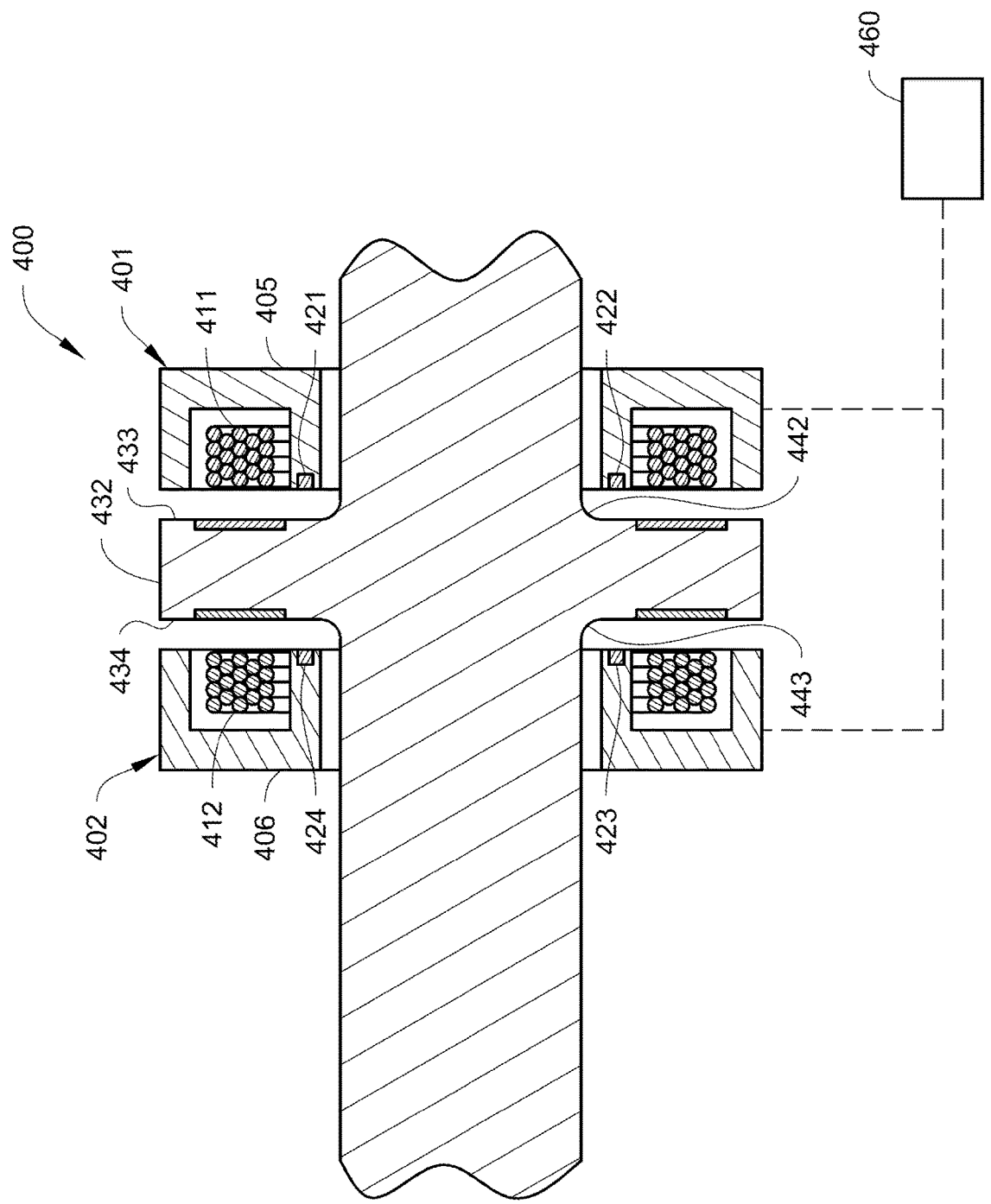
FIG. 4 a schematic sectional view of a bearing, in accordance with at least one embodiment described and recited herein.

FIG. 4 is a schematic sectional view of a set of bearings 400, e.g., magnetic bearings, according to one embodiment. The schematic sectional view can be partial sectional view of the compressor 210 of FIG. 2.

In one embodiment, the set of bearings 400 can be the bearings 270 and 272 in FIG. 2. In one embodiment, a shaft 430 can be the shaft 230 in FIG. 2 or the shaft 330 in FIG. 3. FIG. 4 illustrates a schematic view the set of bearings 400 supporting the shaft 430 in the z-direction or the axial direction of the shaft 430. In some embodiments, the shaft 430 is additionally supported by one or more thrust/radial bearings, for example, as illustrated for the shaft 230 in FIG. 2.

The set of bearings 400 includes a first thrust bearing 401 and a second thrust bearing 402, one or both of which can be non-contact bearings (e.g., magnetic bearings, air bearings, or the like).

The shaft 430 includes a thrust runner 432 that extends in the radial direction of the shaft 430. The thrust runner 432 includes a first thrust surface 433 and a second thrust surface 434. In an embodiment, the bearings 401, 402 axially support the shaft 430. It is appreciated that the bearing 401 and 402 can be the same or similar bearings arranged to support the shaft 430 opposing each other in the z-direction.

As shown in FIG. 4, the bearing 401 includes a stationary member 405, a magnet 411, and two position sensors 421, 422. The bearing 401 is arranged to support the shaft 430 on a first thrust surface 433 on the z-direction. The bearing 402 includes a stationary member 406, a magnet 412, and two position sensors 423, 424. The stationary members 405 and 406 can be installed stationary relative to the housing (e.g. 202 of FIG. 2) of the compressor (e.g., 210 of FIG. 2), for example, by affixing onto the housing of the compressor.

The bearing 402 is arranged to support the shaft 430 on a second thrust surface 434 in the z-direction. The bearing 401 supports the shaft 430 in the z-direction opposite from the bearing 402 so that the shaft 430 levitates in the z-direction, controlled by the bearing 401, 402. In some embodiments, the magnets 411 and 412 can be electromagnets controlled by a controller 460 and/or a main controller for a bearing system that includes the set of bearings 400. In some embodiments, the set of bearings 400 is controlled by the controller 360 shown in FIG. 3. In some embodiments, the set of bearings 400 function as the bearing 300 of FIG. 3 except for supporting the shaft (e.g., 230, 330, 430, etc.) in the axial direction of the shaft (e.g., the z-direction as illustrated in FIG. 4).

The controller 460 can control the set of bearings 400 through, for example, amplifiers (not shown) and the position sensors 421-424, which can measure a distance between the position sensor and the shaft 430. For example, the measured distance can be between the position sensor 421 and a location 441 on the first thrust surface 433 of the shaft 430 facing the position sensor 421; between the position sensor 422 and a location 442 on the first thrust surface 433 of the shaft 430 facing the position sensor 422; between the position sensor 423 and a location 443 on the second thrust surface 434 of the shaft 430 facing the position sensor 423; and/or between the position sensor 424 and a location 444 on the second thrust surface 434 of the shaft 430 facing the position sensor 424. The controller 460 can determine the measured distances from sensed signals received from the position sensors 421-424. The sensed signal corresponds to a measured distance. In order to maintain a location (or a location range) of the shaft 430 in the z-direction, the controller 460 can control the magnetic fields generated by the magnets 411, 412 such that the measured distance and/or the sensed signal from position sensor 421-424 such that the shaft 430 is arranged at a position calibrated for compressor operation. The position can be a levitating position of the shaft.

A compressor is generally calibrated for operating within a temperature range. A re-calibration can include the controller moving the shaft (e.g., 230 of FIG. 2 or 330) to a levitating position that is suitable for uninterrupted and/or safe compressor operation. The re-calibration may be needed, for example, because of the compressor operating at a temperature beyond of the predetermined temperature range. Operating at a temperature beyond the predetermined temperature range can cause thermal expansion/shrinkage to the materials that made of the compressor. Different materials (e.g., aluminum, copper, steel, metal alloys, plastics, etc.) can expand and shrink at different rates relative to temperature changes, changing the relative positions between the bearing system, the shaft, and/or the housing of the compressor. A calibration to position the shaft to a determined or predetermined levitating position that is suitable for the temperature beyond the predetermined temperature range for the uninterrupted and/or safe compressor operation after a calibration may be referred to as re-calibrating or a re-calibration.

It is appreciated that the levitating position can include a radial component (e.g., x and y-directions shown in FIG. 3) and an axial direction (e.g., z-direction). The radial component can be controlled by one or more radial bearings (e.g., 300 of FIG. 3; 250, 254 of FIG. 2; etc.). The axial component can be controlled by the thrust bearings (e.g., the set of bearing 400, bearings 270, 272 of FIG. 2). The calibration or the re-calibration can be performed for any combination of thrust and/or axial bearings.

FIG. 5 is a block diagram of a controller 500 of a bearing system 540 according to an embodiment. The bearing system 540 can refer to the bearings 250, 254, 270, 272 of FIG. 2, the bearing 300 of FIG. 3, or the set of bearings 400 of FIG. 4. In some embodiments, the controller 500 can be configured to control the bearing system 540 by conducting a calibration or re-calibration of one or more bearings in the bearing system 540 based on a detected and/or detected calibration threshold event. For example, the calibration threshold event can include the controller 500 receiving data pertaining to an ambient temperature of the compressor at a threshold level at which it is expected that one or more of the components (e.g., the bearing system) of the compressor have undergone thermal expansion or shrinkage and therefore the bearing system is to be re-calibrated. By conducting a re-calibration based on occurrence of the calibration threshold event, the controller 500 can recalibrate the bearing system 540 before a bearing error induces downtime of the compressor, and/or can reduce or prevent equipment damage (e.g., due to shaft crashing into the bearing or the housing result from thermal expansion and/or shrinkage).

The controller 500 includes a receiver 510, a threshold event detector 520, and a calibrator 530 that is configured to calibrate or recalibrate the bearing system 540. The receiver 510 can receive environmental data 550 pertaining to a compressor. The compressor can be the compressor 110 of FIG. 1, 210 of FIG. 2, or the like. The threshold event detector 520 can detect occurrence of a calibration threshold event based on the received environmental data 550. The calibrator 530 can calibrate or re-calibrate the bearing system 540 based on the detected calibration threshold event by controlling placement of a shaft relative to the bearing system 540 of the compressor.

The controller 500 can be connected to other components, such as the bearing system 540, an environmental data source, a processor 560, a memory 570, a real-time clock 580, one or more remote system 590, one or more sensors 595, and one or more user input device. The controller 500 can be configured to receive the environmental data 550 from the environmental data source.

The environmental data 550 can include any data pertaining to a compressor in order to determine the temperature of the compressor, components (e.g., bearing system, shaft, housing, etc.) of the compressors. The environmental data 550 can include environmental conditions that affect the temperature of the compressor, or the like. For example, environmental data 550 can include an ambient temperature 551 of the compressor, which may include the temperature of the air at or near the compressor, for example, detected by equipment monitoring the environmental conditions at or near the compressor (e.g., a thermostat, an intake temperature sensor for monitoring temperature of intake air from the environment, etc.). The environmental data 550 can include a system temperature 552 such as a bearing system temperature, a temperature corresponding to the compressor, or the like.

The temperature corresponding to the compressor can include a compressor housing temperature, a compressor shaft temperature, a compressor bearing temperature, or the like. The system temperature 552 can be provided by a controller of a bearing system, a controller of the compressor, or the like, that are measured by a temperature sensor (e.g., thermal couples, inferred temperature sensor, or the like). In some embodiments, the system temperature 552 can be deposited by other systems in a depository, such as a memory or a database, to be retrieved by the controller 500.

In some embodiments, the environmental data 550 can include temperature surrogate data 553, such as, saturation pressure(s) of the refrigerant system. The saturation pressure (e.g., of refrigerant) can be converted into the temperature data of the outdoor, providing an ambient temperature pertaining to calibration of the compressor.

The processor 560 can process any data received by the controller 500 and determine one or more controller signals to be transmitted by transmitter 510 of the controller 500. In some embodiments, the process 560 can process data to create new datasets. For example, the process 560 can combine one or more subsets of the environmental data 550 with time data from the real-time clock 580 to create time series temperature data for determining, for example, the temperature of the bearing system, a calibration threshold event, or the like.

The memory 570 can store data for the controller 500 to retrieve. For example, the memory 570 can store the temperature data corresponding to the compressor, the created time series temperature data, a database of historical temperature data mapped to the calibrated position, or the like. The memory 570 can store calibrated positions correlated temperatures of the compressor. The temperature of the compressor can be internal component temperatures or temperature external to the compressor. Environmental data 550 can include, or be used to derive, the ambient temperature, the temperature of the compressor, or the like.

The controller 500 can retrieve data from the data stored in the memory 570 to determine a calibrated position based on, for example, temperature data of the compressor. The controller 500 can retrieve the environmental data 550 to determine calibration threshold event, the calibrated position, the levitating position, or the like.

In some embodiments, one or more remote systems 590 can be in communication with the controller 500, for example, via the transmitter or receiver 510. The remote systems 590 can include data storage, providing data processing service, or the like. For example, the remote systems 590 can include a database of historical temperature data mapped to the calibrated position from one or more compressors of the same or different models collected from users over time that can include, for example, time series data or instant data of ambient temperature, bearing system temperature, age of the bearing system, ages of the compressor, or the like.

The remote system 590 and/or the controller can retrieve data from the database hosted in the remote system 590 to determine a calibrated position based on, for example, a combination of time series temperature data, and the age of the system, or the like. The remote system 590 can collect the environmental data 550 through the controller 500 to determine calibration threshold event, the calibrated position, the levitating position, or the like, for the controller 500. For example, the remote systems 590 can be advantages in having access to more data than the memory 570 on board with the compressor, larger computational power, centrally and more frequently updated algorithms, or the like.

The bearing system 540 can include a dedicated controller and/or directly communicated with the controller 500 to provide data such as the bearing temperature, sensed signal(s) from positions sensors, or the like.

The sensor 595 can include sensors providing sensed signal(s) to the controller 500. The sensed signal(s) can be originated from, position sensors 596, temperature sensors, or the like. In some embodiments, a controller for the position sensors 596 can be in communication with, or be part of, the controller 500. The controller for the position sensors 596 can, for example, check the distance/clearance between the sensed location of the shaft and the position sensor with the calibrated position or location range to determine whether a re-calibration is needed. When the sensed location of the shaft is outside the calibrated location range, a control signal of calibration error 597 can be transmitted to, or generated by, the controller 500. The calibration error 597 can be transmitted by the controller 500 to a controller of the compressor to stop the spinning of the shaft, preventing equipment damages, for example, due to the shaft crashes into the bearing, the housing, or the like.

One or more user input devices can communicate with the controller 500 to provide one or more user input 599. The user input devices can include Human-Machine Interface (HMI) for the compressor, a thermostat, a touch screen, a switch or nob, a telematics system, or the like. For example, a user input 599 can include an instruction for the compressor controller for turning on the compressor. When the control signal for turning on compressor is received by the controller as a user input 599, the controller 500 can hold the operating of the compress until a calibration or re-calibration is completed if the controller 500 detects a calibration threshold event.

In some embodiments, the controller 500 can communicate with other components using a transmitter and/or a receiver 510. A transmitter can receive and/or transmit control signals to other components related to the controller 500. A receiver can receive control signals from other components related to the controller 500. The transmitter or receiver 510 can include a radio wave transmitter, a wired controller signal receiver and/or transmitter, an internet connection, or the like. The transmitter or receiver 510 can be configured to receive the environment date 550, access the remote systems 590, provide control signals to the bearing system 540, communicate with the sensors 595, receive the user input 599, or the like.

The threshold event detector 520 is configured to detect a calibration threshold event based on received data. The received data can include the received environmental data 550, received control signal from the processer 560 and/or the remote systems 590, the bearing system 540, the sensor 595, or the like. In some embodiments, the threshold event detector 520 determine the calibration position, the levitating position, or the like in a calibration.

FIG. 6 is a flow chart showing a method for calibrating a bearing system 600 of a compressor. The compressor can be the compressor 110 of FIG. 1, 210 of FIG. 2, or the like.

The method 600 can re-calibrate the bearing system once a calibration threshold event is detected. The calibration threshold event can be detected when a system temperature indicates or exceeds a threshold temperature. The system temperature can be retrieved or determined by the controller from environmental data. The re-calibration can position the shaft to a determined or predetermined levitating position. The levitating position can be determined according to the environmental data to account for material expansion or shrinkage. The calibrated position of the shaft can be a levitating position of the shaft. The method 600 can include receiving environmental data pertaining to the compressor 610; detecting occurrence of a calibration threshold event based on the received environmental data 620; and re-calibrating a bearing system based on the detected calibration threshold event by controlling position of a shaft relative to the bearing system and/or the housing of the compressor 630. The method 600 can further include calibrating the bearing under a continued schedule.

At 610, the method 600 receives environmental data (e.g., 550 of FIG. 5) from an environmental data source. The received environmental data can include, for example, temperature data of the compressor (e.g., 110 of FIG. 1 and 210 of FIG. 2, or the like). The method 600 proceeds to 620.

At 620, the method detects the occurrence of a calibration threshold event based on the received environment data at 610. In some embodiments, a calibration threshold can include a soaked threshold 621, a threshold temperature 622, a turning on/off instruction 623, 624, a start-up error 625, or the like. Once one or more of the calibration threshold is detected, for example, by the controller (e.g., 360 of FIG. 3, 460 of FIG. 4, 500 of FIG. 5, etc.) a calibration threshold event is detected.

The soaked threshold 621 can include the controller detects a time threshold and a temperature are indicated or exceeded concurrently. For example, the threshold temperature and time threshold can be −30° F. for 1 hour, −20° F. for 2 hours, −10° F. for three hours. The controller detects occurrence of a calibration event when, for example, the system temperature had been below −30° F. for over an hour.

The calibration threshold event can include a threshold temperature 622. The threshold temperature 622 can include the controller detects a calibration threshold event when a detected or determined temperature from the environmental data indicates or exceeds a predetermined threshold temperature. When the temperature detected or determined from the received environmental data (e.g., the received or detected temperature of the bearing system, the compressor, or the like) indicates or exceeds the threshold temperature, a calibration threshold event is detected.

The threshold temperature can be a temperature floor such as a calibration threshold event is detected when the system temperature is at or below a threshold temperature. The threshold temperature can be a temperature ceiling such as a calibration threshold event is detected when the temperature is at or above a threshold temperature. Indicating or exceeding a threshold temperature can include dropping to or below a temperature floor and/or raising to or above a temperature ceiling. For example, the threshold temperature and time threshold can be temperature floors of −30° F., −20° F., −10° F., or the like, and/or temperature ceilings of 100° F., 110° F., 120° F., or the like. The controller detects occurrence of a calibration event when, for example, the system temperature is below −30° F., above 110° F., or the like. In some embodiments, a system temperature can be a determined or detected temperature of a bearing, a bearing system, a compressor, or the like. The system temperature can be determined or detected from the environmental data. Temperature sensors of a particular bearing can transmit a bearing temperature, for example, to a controller. The measured or detected bearing temperature can be transmitted as a temperature corresponding to the compressor, a system temperature, a bearing temperature, or the like. In some embodiments, the system temperature can be a value derived from a combination of temperature measurements. For example, the system temperature can be determined to be the same as the ambient temperature from the environmental data. The system temperature can be determined to be correlated with the ambient temperature of the environmental data based on, for example, a predetermined correlation between the system temperature and the ambient temperature. In some embodiment, the predetermined correlated can include the time series data of the ambient temperature.

In some embodiments, a calibration threshold event can be detected based on receiving an instruction to turn on/or the compressor 623, 624. When an instruction to turn on the compressor 623 is received, for example, by the controller, a calibration threshold event is detected, and, optionally, while holding the shaft stationary to allow a calibration before the shaft start spinning. For example, when an instruction to turn off the compressor 624 is received, a calibration threshold event is detected and the controller can proceed to calibrate the bearing system at 630 before terminating power to the compressor.

In some embodiments, a calibration threshold event can be determined to be detected or occurring continuously 640 following a schedule. For example, the schedule can be calibrating the bearing system every predetermined period of time, e.g., every hour.

Once an occurrence of one or more threshold event is detected, determined, and/or occurred at 620 or 640, the method 600 proceeds to calibrating the bearing system 630.

Calibrating the bearing system 630 can include moving the shaft or operation of the bearing system to a predetermined or determined calibrated position. The calibrated position can be a levitating position of the shaft calibrated by the controller based on the received environmental data. The moving to the calibrated position can include moving in the axial direction relative to the shaft, one or more radial directions relative to the shaft, or both. It is appreciated that, for example, when a first radial bearing is positioned near one end of the shaft and a second radial bearing is positioned near the other end of the shaft (e.g., bearings 250, 254, and the shaft 230 of FIG. 2), moving to the calibrated position can include a radial position relative to the first radial bearing, to the second radial bearing, or both, and/or the axial calibration relative to the thrust bearing(s) (e.g., 270, 272 of FIG. 2, 300 of FIG. 3, or the like).

In some embodiments, the controller can include determining the calibrated position 631 as part of the calibration or re-calibration. Calibrating the bearing systems 630 can also include adjusting the bearing system and/or the shaft to the determined calibrated position at 630. The determined calibrated position 631 can include determine the calibrated position of the bearing system and/or the shaft in the axial and/or radial directions relative to the shaft. The determined calibrated position can be a levitating position of the shaft.

FIG. 7 is a block diagram for determining a calibrated position 700, according to some embodiments. In some embodiments, determining a calibrated position 700 can be performed at 631 of FIG. 6. Determining calibrated position 700 can include the controller (e.g., 360 of FIG. 3, 460 of FIG. 4, 500 of FIG. 5, or the like) to determine a calibrated position based on the environmental data (e.g., 550 of FIG. 5) received by a receiver/transmitter (e.g., 510 of FIG. 5). Determining calibrated position 700 can be performed by a threshold event detector (e.g., 520 of FIG. 5). In some embodiments, the calibrated position can be a configuration of the bearing system and/or the shaft in the axial and/or radial directions. In some embodiments, the calibrated position can be a levitating position of the shaft calibrated according the received environmental data which can be alternatively referred to as a calibrated levitating position or re-calibrated levitating position.

To determine a calibrated position 700, the controller can conduct on-board measurement 710 and/or determining the calibrated position algorithmically 720.

On-board measurement 710 can include one or more of the magnetic bearings moving the shaft to measure one or more distances between the shaft and the housing, bearings, back-up bearings, or the like in order to determine a calibrated position for the bearing system and/or the shaft. In some embodiments, on-board measurement 710 can include physical contacts between the shaft and the housing bearings, back-up bearings, or the like, in order to determine the distances between the shaft and the housing bearings, back-up bearings, or the like. Thus, the on-board measurement is suitable when the compressor is not in operation, for example when the shaft is levitated but stationary (e.g., without spinning or without spinning to produce a target output setpoint of the compressor).

Determining the calibrated position algorithmically 720 can include using a correlation to determine the calibrated position. The inputs 730 of the correlation can include system temperature 731, time series data of the system temperature 732, make and/or model 733, material 734, and any other data related to the compressor collected by the controller. It is appreciated that, compared to on-board measuring 710, algorithmically determining a calibrated position 720 can be conducted while the compressor still in operation because no physical contact of the shaft with the bearing is needed to determine the calibrated position based on the temperature of the compressor. Accordingly, determining the calibrated position algorithmically 720 can allow the calibration or re-calibration during compressor operation.

System temperature 731 can be used to determine or proximate the temperature of the compressor and/or the components due to thermal expansion or shrinkage of a material which generally depends on the present temperature of the material. Time data or time series data of the system temperature 732 can refine the determination or approximation of the temperature of the compressor and/or the components by accounting for the rate of heat transfer. For example, the shaft at the center of the compressor may takes a longer time to reach the ambient temperature than the amount of time took the housing (being closer to the exterior of the compressor compared to the shaft) to reach the same ambient temperature.

The make and/or model 733 of the compressor, shaft, and bearing can have different material property that results in different rate of heat transfer and/or rate of thermal expansion and shrinkage, affecting the algorithm determining the calibrated position.

The material 734 (e.g., of the compressor, the bearing system, the shaft, or the like) can affect the rate of heat transfer and/or rate of thermal expansion and shrinkage, affecting the algorithm determining the calibrated position.

Accordingly, one or more of the inputs 731 can be provided to the algorithm 740 to determine an output 750 that include the determined calibrated position based on the environmental data. The determined calibrated position can be a calibrated position for the bearing system, for the levitating position of the shaft, or the like.

The algorithm 740 can be constructed statistically by collected historic data 741 that maps the one or more of the inputs 731 to the output 750. In some embodiments, the historic data 741 can include the calibrated position determined from on-board measurement (e.g., 710) with any or all the corresponding inputs 731.

The algorithm 740 can alternatively determine a calibrated position by one or more correlations 742 constructed using any or all the input 731 to determine the calibrated position. In some embodiments, the correlation can be constructed from historic data 741 and further incorporating thermal-physical properties of material (e.g., rate of thermal expansion, rate of heat transfer, dimensions at a reference temperature, etc.), and/or the like.

The algorithm 740 can alternatively determine a calibrated position by a machine learning algorithm 743 constructed using any or all the input 731 to determine a calibrated position. In some embodiments, the learning algorithm 743 can be constructed from historic data 741 that maps any or all the inputs 731 with calibrated position.

The output 750 of determining the calibrated position algorithmically 720 can include transmitting a control signal adjust the compressor according to the calibrated position determined. Adjusting the compressor can include adjusting the bearing system, the bearing, the shaft's levitating position, or the like.

ASPECTS

It is noted that any of aspects 1-10 can be combined with any of aspects 11-15 and any of aspects 16-20.

Aspect 1. A controller comprising:
a receiver to receive environmental data pertaining to a compressor;
a threshold event detector to detect occurrence of a calibration threshold event based on the received environmental data; and
a calibrator to re-calibrate a bearing system based on the detected calibration threshold event by controlling placement of a shaft relative to the bearing system of the compressor.

Aspect 2. The controller of aspect 1, wherein the environmental data include a temperature corresponding to the compressor.

Aspect 3. The controller of aspect 1 or aspect 2, wherein
the calibration threshold event is a threshold temperature, and
the threshold event detector is to detect the calibration threshold event based on the received temperature.

Aspect 4. The controller of any one of aspects 1-3, wherein the calibration threshold event includes the received environmental data indicating a threshold temperature.

Aspect 5. The controller of any one of aspects 1-4, wherein the calibrator is to re-calibrate the bearing system in an axial direction of the shaft based on the received environmental data.

Aspect 6. The controller of any one of aspects 1-5, wherein the bearing system comprises one or more axial magnetic bearings arranged to levitate the shaft, and the calibrator is to re-calibrate the one or more axial magnetic bearings relative to the shaft.

Aspect 7. The controller of any one of aspects 1-6, wherein the bearing system comprises one or more radial magnetic bearings arranged to levitate the shaft, and the calibrator is to re-calibrate the one or more radial magnetic bearings relative to the shaft.

Aspect 8. The controller of any one of aspects 1-7, wherein the bearing system comprises one or more position sensors to measure a levitating position of the shaft.

Aspect 9. The controller of any one of aspects 1-8, wherein the threshold event detector is to re-calibrate the bearing system to a predetermined position based on the received environmental data.

Aspect 10. The controller of any one of aspects 1-9, wherein the compressor is a centrifugal compressor.

Aspect 11. A method of calibrating a bearing system of a compressor, the method comprising:
receiving environmental data pertaining to the compressor;
detecting occurrence of a calibration threshold event based on the received environmental data; and
re-calibrating a bearing system based on the detected calibration threshold event by controlling placement of a shaft relative to the bearing system of the compressor.

Aspect 12. The method of aspect 11, wherein the calibration threshold event is a threshold temperature.

Aspect 13. The method of aspect 11 or aspect 12, wherein the re-calibrating of the bearing system occurs before the compressor is in operation.

Aspect 14. The method of any one of aspects 11-13, further comprising re-calibrating the bearing system to a predetermined position based on the received environmental data.

Aspect 15. The method of any one of aspects 11-14, further comprising measuring a levitating position of the shaft using one or more position sensors.

Aspect 16. A non-transitory computer-readable medium for a controller that stores computer-executable instructions that, upon execution, cause one or more processors to execute functions for calibrating a bearing system of a compressor, the instructions comprising:
receiving environmental data pertaining to the compressor;
detecting occurrence of a calibration threshold event based on the received environmental data; and
re-calibrating a bearing system based on the detected calibration threshold event by controlling placement of a shaft relative to the bearing system of the compressor.

Aspect 17. The non-transitory computer-readable medium of aspect 16, wherein the calibration threshold event is a threshold temperature.

Aspect 18. The non-transitory computer-readable medium of aspect 16 or 17, wherein the instruction for re-calibrating of the bearing system is executed before the compressor is in operation.

Aspect 19. The non-transitory computer-readable medium of any one of aspects 16-18, wherein the instructions further comprise:
re-calibrating the bearing system to a predetermined position based on the received environmental data.

Aspect 20. The non-transitory computer-readable medium of any one of aspects 16-19, wherein the instructions further comprise: measuring a levitating position of the shaft using one or more position sensors.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:
1. A controller comprising:
a receiver to receive environmental data of an environment pertaining to a compressor;
a threshold event detector to:
detect occurrence of a calibration threshold event based on the received environmental data,
wherein the calibration threshold event includes the receiver receiving a temperature data of the environment pertaining to the compressor being at or above a threshold temperature, and
wherein the temperature data include an ambient temperature; and
a calibrator to re-calibrate a bearing system based on the detected calibration threshold event by controlling placement of a shaft relative to the bearing system of the compressor.

2. The controller of claim 1, wherein the environmental data includes a temperature corresponding to the compressor.

3. The controller of claim 1, wherein the calibrator is configured to re-calibrate the bearing system in an axial direction of the shaft based on the detected calibration threshold event.

4. The controller of claim 1, wherein
the bearing system comprises one or more axial magnetic bearings arranged to levitate the shaft, and
the calibrator is configured to re-calibrate the one or more axial magnetic bearings relative to the shaft.

5. The controller of claim 1, wherein
the bearing system comprises one or more radial magnetic bearings arranged to levitate the shaft, and
the calibrator is configured to re-calibrate the one or more radial magnetic bearings relative to the shaft.

6. The controller of claim 1, wherein the bearing system comprises one or more position sensors to measure a levitating position of the shaft.

7. The controller of claim 1, wherein the threshold event detector is configured to re-calibrate the bearing system to a predetermined position based on the detected calibration threshold event.

8. The controller of claim 1, wherein the compressor is a centrifugal compressor.

9. A method of calibrating a bearing system of a compressor, the method comprising:
receiving environmental data of an environment pertaining to the compressor;
detecting occurrence of a calibration threshold event based on the received environmental data,
wherein the calibration threshold event includes receiving temperature data of the environment pertaining to the compressor being at or above a threshold temperature, and
wherein the temperature data include an ambient temperature; and
re-calibrating the bearing system based on the detected calibration threshold event by controlling placement of a shaft relative to the bearing system of the compressor.

10. The method of claim 9, wherein the re-calibrating of the bearing system occurs before the compressor is in operation.

11. The method of claim 9, further comprising re-calibrating the bearing system to a predetermined position based on the detected calibration threshold.

12. The method of claim 9, further comprising measuring a levitating position of the shaft using one or more position sensors.

13. A non-transitory computer-readable medium for a controller that stores computer-executable instructions that, upon execution, cause one or more processors to execute functions for calibrating a bearing system of a compressor, the instructions comprising:

receiving environmental data of an environment pertaining to the compressor;

detecting occurrence of a calibration threshold event based on the received environmental data,
- wherein the calibration threshold event includes receiving temperature data of the environment pertaining to the compressor being at or above a threshold temperature, and
- wherein the temperature data include an ambient temperature; and re-calibrating the bearing system based on the detected calibration threshold event by controlling placement of a shaft relative to the bearing system of the compressor.

14. The non-transitory computer-readable medium of claim 13, wherein the instruction for re-calibrating of the bearing system is executed before the compressor is in operation.

15. The non-transitory computer-readable medium of claim 13, wherein the instructions further comprise:
re-calibrating the bearing system to a predetermined position based on the detected calibration threshold event.

16. The non-transitory computer-readable medium of claim 13, wherein the instructions further comprise:
measuring a levitating position of the shaft using one or more position sensors.

* * * * *